(12) United States Patent
Fu et al.

(10) Patent No.: US 9,774,514 B2
(45) Date of Patent: Sep. 26, 2017

(54) AUTOMATIC HEALTH-CHECK METHOD AND DEVICE FOR ON-LINE SYSTEM

(71) Applicant: China Unionpay Co., Ltd., Shanghai (CN)

(72) Inventors: Yisheng Fu, Shanghai (CN); Naigeng Ji, Shanghai (CN); Longhui Tian, Shanghai (CN); Jianzhao Wu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 558 days.

(21) Appl. No.: 14/364,290

(22) PCT Filed: Dec. 13, 2012

(86) PCT No.: PCT/CN2012/086563
§ 371 (c)(1),
(2) Date: Jun. 10, 2014

(87) PCT Pub. No.: WO2013/086999
PCT Pub. Date: Jun. 20, 2013

(65) Prior Publication Data
US 2014/0372602 A1 Dec. 18, 2014

(30) Foreign Application Priority Data
Dec. 13, 2011 (CN) .......................... 2011 1 0413940

(51) Int. Cl.
*G06F 15/16* (2006.01)
*H04L 12/26* (2006.01)
*G06F 11/30* (2006.01)

(52) U.S. Cl.
CPC ...... *H04L 43/0847* (2013.01); *G06F 11/3055* (2013.01); *H04L 43/16* (2013.01)

(58) Field of Classification Search
CPC ... H04L 43/0847; H04L 43/16; G06F 11/3055
See application file for complete search history.

(56) References Cited

U.S. PATENT DOCUMENTS

| | | | |
|---|---|---|---|
| 8,639,797 B1 * | 1/2014 | Pan ........................ | H04L 43/12 709/223 |
| 2005/0108377 A1 * | 5/2005 | Lee ..................... | H04L 63/1408 709/223 |
| 2007/0266138 A1 * | 11/2007 | Spire ................... | G06F 11/0709 709/223 |

FOREIGN PATENT DOCUMENTS

| | | |
|---|---|---|
| CN | 1940884 A | 4/2007 |
| CN | 101625740 A | 1/2010 |
| WO | WO 2011/126635 A1 | 10/2011 |

OTHER PUBLICATIONS

First Office Action English Translation, State Intellectual Property Office, P.R. China, 7 pages.

* cited by examiner

*Primary Examiner* — Viet Vu
(74) *Attorney, Agent, or Firm* — Blakely Sokoloff Taylor & Zafman LLP

(57) ABSTRACT

The invention provides an automatic health check method for on-line system, comprising the following steps: receiving current status data of the on-line system from the on-line system; updating historical status statistical data based on the current status data, wherein the historical status statistical data is a statistical result for the status data of the on-line system until a previous moment from the moment when the on-line system starts to operate; transmitting the updated historical status statistical data to the on-line system; and the on-line system determining whether it is operating normally according to the updated historical status statistical data. In addition, the present invention correspondingly provides an automatic health check apparatus for (Continued)

on-line system. The method and apparatus according to the present invention can provide an effective and reliable health check mechanism for an on-line system such as bank POS transaction system.

11 Claims, 3 Drawing Sheets

AUTOMATIC HEALTH-CHECK METHOD AND DEVICE FOR ON-LINE SYSTEM

FIELD OF THE INVENTION

The present invention generally relates to the technical field of information processing, and in particular, to an automatic health check method and apparatus for an on-line system.

BACKGROUND

With continuous development of information technology and network technology, the concept of using network to achieve information transfer and resource share has been widely applied to various industries. The banking industry is one of the industries where information technology is the most widely applied. Basically all the commercial banks have realized on-line processing for bank transaction system, which means an on-line transaction processing system has been built.

Generally, an on-line transaction processing system can collect and process transaction-related data in real time and can share database and change in status of other files. A transaction can be considered as a discrete unit of work. For example, a transaction could be a write operation for modifying a user's account balance or inventory item. In on-line transaction processing, the transaction is typically executed immediately, which is contrary to batch processing. In the case of batch processing, a batch of transactions are stored for a period of time and executed after that. Most of the batch processing (e.g., exchange of accounta) is executed in the night. Civil aviation ticket booking system and bank POS system are examples of on-line transaction processing system, in terms of which the real time characteristic of on-line transaction processing system can be easily understood.

Health check and corresponding control could be very important for an on-line transaction processing system which has high demands on availability. Specifically, health check comprises examining transaction processing condition on each process, occupation condition of system hardware resource occupation in the on-line transaction processing system, etc. Taking the banking industry as an example, POS system has to be able to provide service for people 24 hours every day in many cases, while no occurrence of failure has to be ensured. With the development of economy, the requirements on this kind of service and the demands on reliability are also increasing. In such cases, manual system check and emergency handling control can not meet demands on availability of on-line system any more. Automatic health check has become a necessary part of such systems. However, in existing automatic health check solutions, system operation status threshold is often set by human. Therefore, there exist problems such as poor flexibility and low accuracy in status check, etc. Moreover, for some automatic health check apparatuses, an instruction from external system is still required to execute control measures, which makes emergency reaction too slow and thus emergency situations not handled timely.

For these reasons, there is a great need for self-adaptive automatic health check method and apparatus that provides high sensitivity and high accuracy.

SUMMARY OF THE INVENTION

The objective of the present invention is to provide an automatic health check method and apparatus which is suitable for on-line system, and is flexible, efficient and has a high level of accuracy so that the on-line system which continuously operates for a long period of time can make an precise determination on its operating status in real time and make a timely response.

In order to achieve the above objective, the present invention provides an automatic health check method for an on-line system, comprising the following steps: receiving current status data of the on-line system from the on-line system; updating historical status statistical data based on the current status data, wherein the historical status statistical data is a statistical result for the status data of the on-line system until a previous moment from the moment when the on-line system starts to operate; transmitting the updated historical status statistical data to the on-line system; and the on-line system determining whether it is operating normally according to the updated historical status statistical data.

Preferably, updating historical status statistical data based on the current status data comprises: comparing the current status data with the historical status statistical data; determining whether the current status data is abnormal data according to the result of comparison; maintaining the historical status statistical data unchanged when the current status data is determined as abnormal data; and incorporating the current status data into the historical status statistical data when the current status data is not determined as abnormal data.

In some embodiments of the present invention, incorporating the current status data into the historical status statistical data comprises incorporating the current status data into the historical status statistical data according to the following formula:

$$F_t = \alpha X_t + (1-\alpha) F_{t-1}$$

wherein $X_t$ represents the current status data; $F_t$ represents the current historical status statistical data; $F_{t-1}$ represents the historical status statistical data at a previous moment; and a is a weighting constant, the value range of which is (0.5, 1].

In some other embodiments of the present invention, incorporating the current status data into the historical status statistical data comprises calculating an average of all periods for the current status data and the historical status statistical data.

Preferably, comparing the current status data with the historical status statistical data comprises calculating a discrepancy rate between the current status data and the historical status statistical data, wherein the discrepancy rate is a ratio of the difference between the current status value and the historical status statistical value to the historical status statistical value.

Preferably, determining whether the current status data is abnormal data according to the result of comparison comprises determining the current status data as abnormal data when the discrepancy rate is larger than a predetermined threshold.

In some embodiments of the present invention, the current status data is occurrence rate of error code, processing time of a single transaction on a process in the on-line system, idle time of the process or the number of pending tasks on the process.

In some embodiments of the present invention, the current status data is based on a single transaction on a process in the on-line system or multiple transactions on a process in the on-line system.

In some embodiments of the present invention, the current status data is the usage of disk space in the system or the usage of physical memory.

The present invention also provides an automatic health check apparatus for an on-line system, comprising: a historical status statistical database for storing historical status statistical data, the historical status statistical data is a statistical result for the status data of the on-line system until a previous moment from the moment when the on-line system starts to operate; a status collecting module for receiving current status data of the on-line system from the on-line system; a statistic analysis module for updating the historical status statistical data based on the current status data; and a result feedback module for transmitting the updated historical status statistical data to the on-line system, wherein the on-line system determines whether it is operating normally according to the updated historical status statistical data.

The method and apparatus provided by the present invention can provide an effective and reliable health check mechanism for an on-line system such as bank POS transaction system. Unlike traditional ways of setting threshold or reference by human, the method and apparatus of the present invention adjusts a threshold for the system operating status in real time by making a statistic analysis on a current status and a historical status of the operation of the on-line system as a whole, so that the on-line system can accurately and reliably determines whether each process therein or the status of hardware is normal. In this way, measures can be taken timely and the losses caused by not handling the failure on time could be avoided. The method and apparatus of the present invention will be described hereinafter with reference to particular embodiments.

BRIEF DESCRIPTION OF THE DRAWINGS

The above and other objects, characteristics and advantageous of the present invention will become obvious from the following detailed description of the embodiments of the present invention as shown in the accompanying drawings.

DETAILED DESCRIPTION OF THE INVENTION

Figure 1:
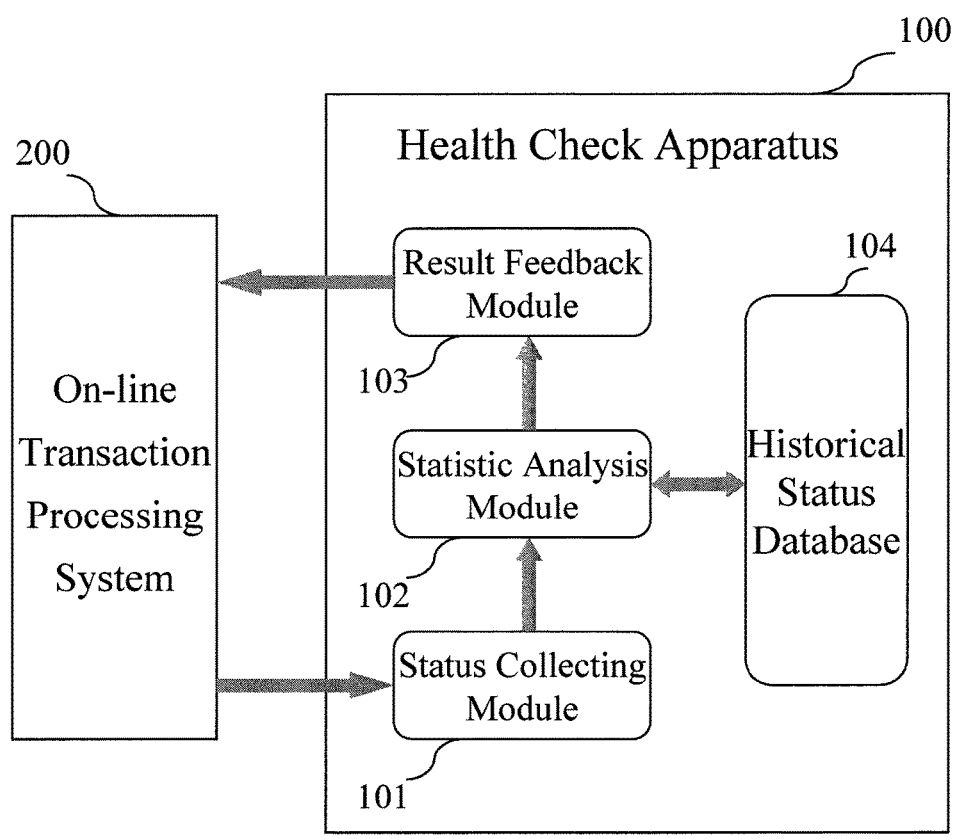
FIG. 1 schematically shows an on-line system automatic health check apparatus according to an embodiment of the present invention.

The invention will be further described in detail hereinafter with reference to the accompanying drawings and particular embodiments. It should be noted that various structures in the drawings are merely illustrated in a schematic way so that those with ordinary skills in the art can best understand the principle of the present invention. The drawings are not necessarily drawn to scale.

FIG. 1 shows a block diagram of an on-line system automatic health check apparatus according to an embodiment of the present invention, wherein the apparatus is schematically shown in communication connection with an on-line transaction processing system 200. The communication connection can be realized by any wired or wireless information transmission technology in the prior art. In addition, the automatic health check apparatus can also be provided in the on-line transaction processing system 200 wholly as an independent unit.

Figure 2:
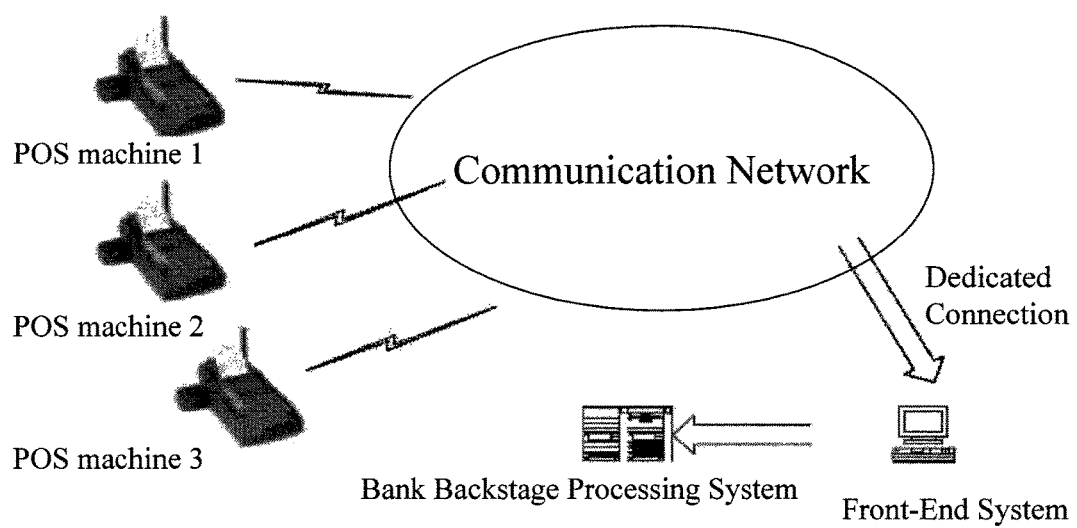
FIG. 2 schematically shows an example where a bank POS transaction system serves as the on-line system.

In practice, the on-line transaction processing system 200 could be a bank POS transaction system, ATM transaction system, etc., for example. FIG. 2 schematically shows an example where a bank POS transaction system serves as the on-line transaction processing system. The health check method and apparatus provided by the present invention will be described below using the bank POS transaction system as an example. However, those with ordinary skills in the art will understand that the present invention is not limited to bank POS transaction system; rather, it could be applied to any on-line transaction processing system having similar characteristics.

A POS transaction system is a Point of Sale transaction system, which directly reads sales information of the merchandise (e.g., name of merchandise, unit price, sales volume, sales time, store of sales, customer, etc.) by an automatic reading device (e.g., cash register) when the merchandise is being sold, sends the information to a backstage processing system via communication network and computer system for analysis, verification, settlement and final completion of transaction. Currently, the commonly used bank POS transaction system is a typical on-line transaction processing system. As shown in FIG. 1, the system comprises a plurality of POS terminals at various locations, which are shown merely in a schematic way in FIG. 1 as POS machines 1-3. In practice, the number of POS terminals is far more than three. Each POS terminal is connected to a POS front-end system in various ways of communication and then connected to a bank backstage processing system via the POS front-end system. The front-end system is an operation platform centered on exchange, the fundamental function of which is to achieve unified access of channels and message exchange with other systems at the backstage. The front-end system can be considered as functioning as a gateway, which provides network access service for POS terminals and serves to conduct protocol conversion and message exchange. Transaction requests on each POS terminal will be processed in bank backstage processing system in real time. Since an enormous amount of POS terminals are simultaneously connected to the backstage processing system and send various transaction processing requests simultaneously in actual use, a plurality of processes are required to be provided to execute a plurality of transactions in parallel, and each process can also have a plurality of pending transactions thereon simultaneously.

When the automatic health check apparatus for on-line system as provided by the present invention is applied to a bank POS transaction system, it is typically disposed in communication connection with a bank backstage processing system, or it could also be directly implemented in the bank backstage processing system wholly as a unit module. The automatic health check apparatus can be used to examine the operation status of each process for transaction processing in the backstage processing system, and be used to check usage conditions of hardware resources (e.g., system disk space, physical memory, etc.) of the backstage processing system itself.

In the embodiment shown in FIG. 1, the on-line system automatic health check apparatus 100 comprises a status collecting module 101, a statistic analysis module 102, a result feedback module 103 and a historical status database 104. Specifically, the status collecting module 101 is used to communicate with the on-line system 200 and is equivalent to a data transmission interface. The on-line system 200 can send various status information to the health check apparatus 100 via the status collecting module 101. A unified format may be specified for the various status information according to the way in which communication is performed so as to facilitate subsequent analysis. The statistic analysis module 102 is used to analyze status information received from the on-line system 200 and the specific operation thereof will be described below with reference to FIG. 3. The result feedback module 103 is used to send the result of analysis back to the on-line system. The result feedback module 103 firstly converts the data from the statistic analysis module into the same format as the status collecting module 101 so as to facilitate the receipt by the on-line system 200.

The historical status database 104 is used to store historical status statistical data. The historical status statistical data is a statistical result for the data that represents the operational status of the on-line system 200 until a previous moment from the moment when the on-line system starts to operate. Said data that represents the operational status of the on-line system, i.e., the status data of the on-line system, could be occurrence rate of error code, processing time of a single transaction on a process in the on-line system, idle time of the process or the number of pending tasks on the process. All of the data that represents the operational status of the on-line system as discussed above is closely related to the transactions it handles. Therefore, the transmission of these status data by the on-line system 200 could be triggered by the transactions. For example, the processing time of each transaction, the time interval between the completion of a previous transaction and the arrival of next transaction (idle time of a process), the number of pending tasks at every moment, result of transaction processing (occurrence rate of error code), etc., are collected during the transaction processing on each process. In addition, the status data could also represent status of the on-line system that is relatively irrelevant to transaction, e.g., usage conditions of system disk space or physical memory. The on-line system 200 could collect such status data on a regular basis and send it to the health check apparatus 100.

It should be understood that the embodiment as shown in FIG. 1 is merely exemplary. The on-line system automatic health check apparatus as provided by the present invention can be divided into functional modules in other ways, as long as the health check apparatus can achieve the functions that are obtained by a combination of the above-discussed modules as a whole.

Figure 3:
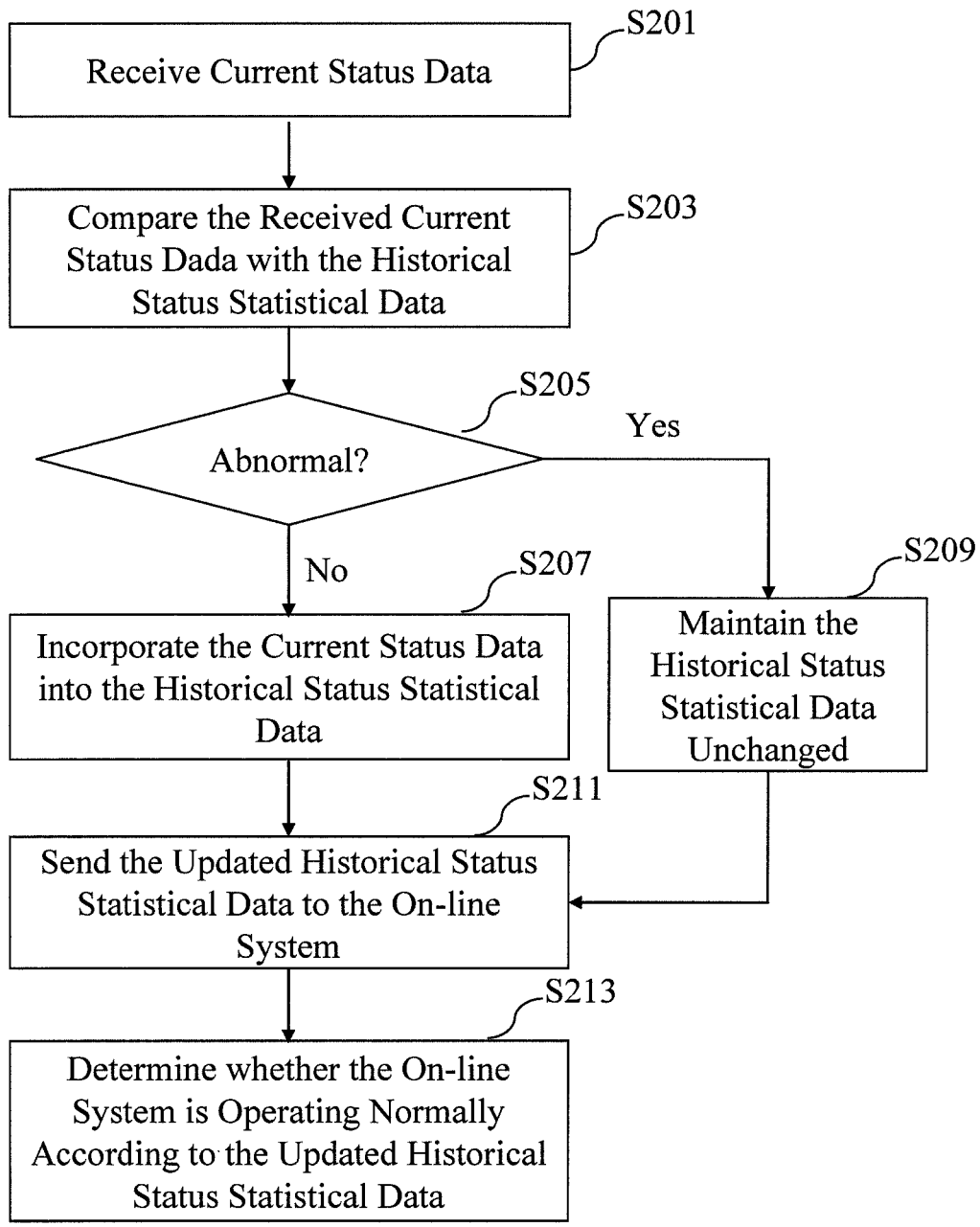
FIG. 3 schematically shows a flowchart of an on-line system automatic health check method according to an embodiment of the present invention.

FIG. 3 schematically shows a flowchart of an on-line system automatic health check method according to an embodiment of the present invention. The method as provided by the present invention will be described below with reference to the apparatus shown in FIG. 1.

First, at step S201, the health check apparatus 100 receives current status data from the on-line system 200 via the status collecting module 101. The current status data is the data that represents the operation status of the on-line system which is collected most recently by the on-line system. When the status data is the data closely related to transactions, such as transaction processing time, occurrence rate of error code, etc., the current status data could be based on a single transaction on the process in the on-line system or multiple transactions on the process in the on-line system. In other words, when the transaction concurrency value on the process is large, the on-line system can collect the status data of N transactions on a certain process within a period of time and send them to the health check apparatus 100. The collection could for example be averaging the N data corresponding to the N transactions. When the transaction concurrency value on the process is small, the status data corresponding to each transaction can be sent individually as the current status data.

Next, at step S203, the received current status data is compared with the historical status statistical data. Preferably, the comparison may comprise calculating a discrepancy rate between the current status data and the historical status statistical data, wherein the discrepancy rate is a ratio of a difference between the current status value and the historical status statistical value to the historical status statistical value.

For example, if the processing time of a single transaction on a certain process sent from the on-line system is 1.7 seconds, and the historical statistical value of the status data is 1 second, then the discrepancy rate is 70%. If the occurrence rate of a certain error code sent from the on-line system is 4% and the historical statistical value of the status data is 1%, then the discrepancy rate is 300%. It should be understood that other calculating methods known by those skilled in the art can also be used to obtain a value for measuring the difference between the current status data and the historical status statistical data.

At step S205, it is determined whether the current status data is an abnormal data according to the result of comparison as obtained at the previous step. When the result of comparison is the above-discussed discrepancy rate, a discrepancy rate threshold can be set. That is, when the discrepancy rate is larger than the predetermined threshold, the current status data is determined as an abnormal data; otherwise, the current status data is considered as normal. For example, when the current status data is the processing time of a single transaction on a certain process, the predetermined threshold can be set at 50%. Therefore, when the actually calculated discrepancy rate is 70%, the processing time of a single transaction of 1.7 seconds is an abnormal data with respect to the historical statistical value of 1 second. When the current status data is the occurrence rate of error code, the predetermined threshold can be set at 300%. Therefore, when the actually calculated discrepancy rate is 300%, the occurrence rate of error code of 4% is an abnormal data with respect to the historical statistical value of 1%.

As shown in FIG. 3, when the current status data is determined as abnormal data, the process proceeds to step S209, at which the historical status statistical data is maintained unchanged. That is, the historical status statistical data at a previous moment is used as the current historical status statistical data so that an adverse influence caused by a similar noise data on the reliability of a long term historical status statistical data can be avoided, thus providing the on-line system with a reference standard for abnormal condition which has a confidence level as high as possible.

When the current status data is not determined as abnormal data, the process proceeds to step S207, at which the current status data is incorporated into the historical status statistical data. As mentioned previously, the historical status statistical data is a long term statistical result for its status data since the moment when the on-line system starts to operate. As can be seen from steps S207 to S209, according to the method of the present invention, only non-abnormal status data will be counted up altogether in the process of doing a statistic.

The incorporation is a process to update the historical status statistical data. Preferably, the incorporation can be performed according to the following formula:

$$F_t = \alpha X_t + (1-\alpha) F_{t-1}$$

wherein $X_t$ represents the current status data; $F_t$ represents the current historical status statistical data; $F_{t-1}$ represents the historical status statistical data at a previous moment; a is a weighting constant, the value range of which is (0.5, 1]. With a long term operation of the on-line system, a tendency of data variation reflects a variation tendency in transaction development. Therefore, it is required to take weights of data into consideration during a long term statistic for status data. For a real time on-line system, generally, the newer the data is, the more accurately it would be able to reflect the current operation status of the system. Therefore, the current status data will be applied a larger weight when statistic is run on the status data, i.e., the parameter a in the above formula is set within the range of (0.5, 1]. The value of a can be set in advance by experience, or can be adjusted according to the confidence level of the result that is acquired after the on-line system has operated for a period of time.

In addition, the incorporation can also be made by calculating an average of all periods for the current status data and the historical status statistical data. The average of all periods is an arithmetic average of all the status data that is not abnormal, as shown in the follow formula:

$$F_t=(X_t+F_{t-1})/N_t$$

wherein $X_t$ represents the current status data; $F_t$ represents the current historical status statistical data; $F_{t-1}$ represents the historical status statistical data at the previous moment; and $N_t$ represents the total number of all the status data that is not abnormal until the current moment. In this way, since the current status data which is determined as abnormal has been removed previously, it can be ensured that a status data statistical result that is effective and available can be obtained to serve as the basis on which the on-line system determines whether it is operating normally.

The above steps S203-S209 can be completed in the statistic analysis module 102 of the health check apparatus 100. However, as mentioned above, the modules can be divided in other ways as long as the method steps shown in FIG. 3 can be implemented.

At step S211, the updated historical status statistical data can be sent back to the on-line system 200 via the result feedback module 103 in the health check apparatus 100, as mentioned above. Further, at step S213, the on-line system 200 can determine whether it is operating normally according to the result. Generally, in an on-line system such as bank POS transaction system, the transaction concurrency value on each process is often pretty large. Therefore, the updated historical status statistical data can be used for a period of time as a reference for determining whether the system is operating normally.

In fact, the continuously updated status statistical result in the present invention provides a dynamic threshold for the on-line system, which is subject to self-adaptive updating continuously with the transaction processing conditions of the system, thus enabling the on-line system to be always highly sensitive to various failures and greatly reducing false-alarms or false-negatives.

It should be noted that the above specific embodiments are merely used for illustrating the technical solutions of the invention rather than limiting the invention. Although the invention has been described in detail with reference to the above specific embodiments, it is understood by those with ordinary skills in the art that the specific embodiments of the invention can be modified or some technical features can be substituted equivalently without departing from the essence of the invention. Such modifications and substitutions also fall within the scope of protection of the invention.

The invention claimed is:

1. An automatic health check method for an on-line system, comprising:
   receiving current status data of the on-line system from the on-line system;
   updating historical status statistical data based on the current status data, wherein the historical status statistical data is a statistical result for the status data of the on-line system until a previous moment from the moment when the on-line system starts to operate, wherein said updating includes:
   comparing the current status data with the historical status statistical data;
   determining whether the current status data is abnormal data according to the result of comparison;
   maintaining the historical status statistical data unchanged when the current status data is determined as abnormal data; and
   incorporating the current status data into the historical status statistical data when the current status data is not determined as abnormal data;
   said method further comprising transmitting the updated historical status statistical data to the on-line system; and
   the on-line system determining whether it is operating normally according to the updated historical status statistical data,
   wherein comparing the current status data with the historical status statistical data comprises calculating a discrepancy rate between the current status data and the historical status statistical data, and
   wherein the discrepancy rate is a ratio of the difference between the current status value and the historical status statistical value to the historical status statistical value.

2. The method according to claim 1, wherein incorporating the current status data into the historical status statistical data comprises incorporating the current status data into the historical status statistical data according to the following formula:

$$F_t=\alpha X_t+(1-\alpha)F_{t-1}$$

wherein Xt represents the current status data; Ft represents the current historical status statistical data; Ft−1 represents the historical status statistical data at the previous moment; and α is a weighting constant, the value range of which is (0.5, 1].

3. The method according to claim 1, wherein incorporating the current status data into the historical status statistical data comprises calculating an average of all periods for the current status data and the historical status statistical data.

4. The method according to claim 1, wherein determining whether the current status data is abnormal data according to the result of comparison comprises determining the current status data as abnormal data when the discrepancy rate is larger than a predetermined threshold.

5. The method according to claim 1, wherein the current status data is based on a single transaction on a process in the on-line system or multiple transactions on a process in the on-line system.

6. The method according to claim 1, wherein the status data of the on-line system is occurrence rate of error code, processing time for a single transaction on a process in the on-line system, idle time of the process or the number of pending tasks on the process.

7. The method according to claim 1, wherein the status data of the on-line system is the usage of disk space in the system or the usage of physical memory.

8. An automatic health check apparatus for an on-line system, comprising:
   a historical status statistical database for storing historical status statistical data, the historical status statistical data is a statistical result for the status data of the on-line system until a previous moment from the moment when the on-line system starts to operate;
   a status collecting module for receiving current status data of the on-line system from the on-line system;
   a statistic analysis module for updating the historical status statistical data based on the current status data, wherein said updating includes:
   comparing the current status data with the historical status statistical data;
   determining whether the current status data is abnormal data according to the result of comparison;
   maintaining the historical status statistical data unchanged when the current status data is determined as abnormal data; and
   incorporating the current status data into the historical status statistical data when the current status data is not determined as abnormal data; and
   a result feedback module for transmitting the updated historical status statistical data to the on-line system, wherein the on-line system determines whether it is operating normally according to the updated historical status statistical data,
   wherein comparing the current status data with the historical status statistical data comprises calculating a discrepancy rate between the current status data and the historical status statistical data, and
   wherein the discrepancy rate is a ratio of the difference between the current status value and the historical status statistical value to the historical status statistical value.

9. The apparatus according to claim 8, wherein incorporating the current status data into the historical status statistical data comprises incorporating the current status data into the historical status statistical data according to the following formula:

$$F_t = \alpha X_t + (1-\alpha) F_{t-1}$$

wherein Xt represents the current status data; Ft represents the current historical status statistical data; Ft−1 represents the historical status statistical data at the previous moment; and α is a weighting constant, the value range of which is of (0.5, 1).

10. The apparatus according to claim 8, wherein incorporating the current status data into the historical status statistical data comprises calculating an average of all periods for the current status data and the historical status statistical data.

11. The apparatus according to claim 8, wherein determining whether the current status data is abnormal data according to the result of comparison comprises determining the current status data as abnormal data when the discrepancy rate is larger than a predetermined threshold.

* * * * *